June 17, 1952 — M. W. BURGESS — 2,601,088
DETACHABLE FLAGSTAFF
Filed Jan. 13, 1948
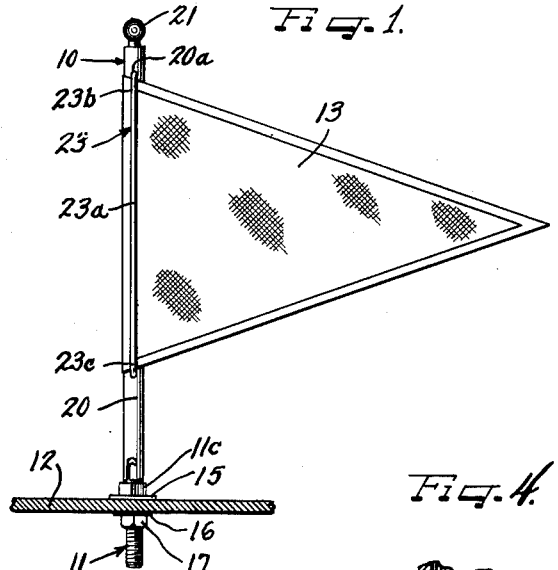
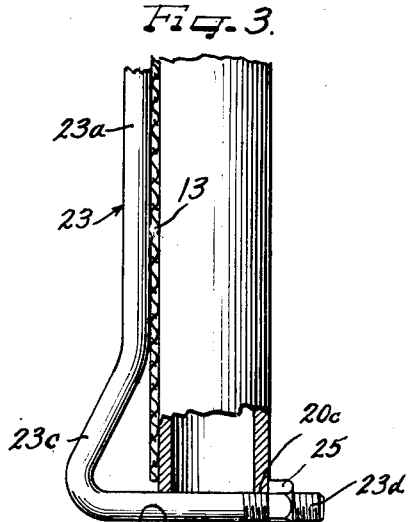
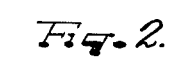
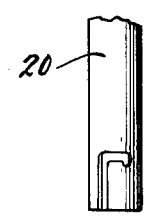
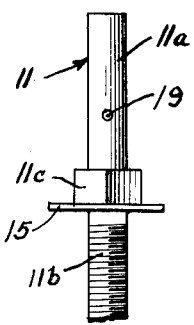
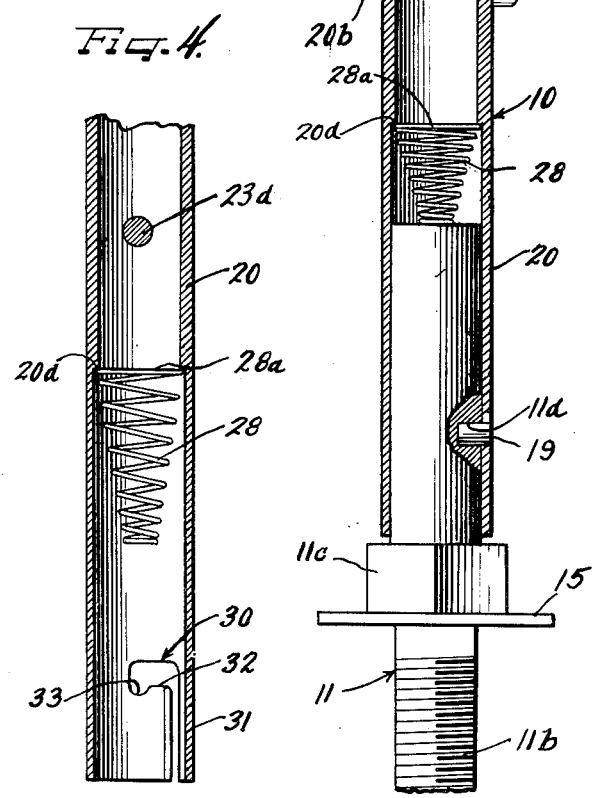
Inventor
MAURICE W. BURGESS Patented June 17, 1952

2,601,088

UNITED STATES PATENT OFFICE 2,601,088

DETACHABLE FLAGSTAFF

Maurice W. Burgess, Joliet, Ill.

Application January 13, 1948, Serial No. 2,110

1 Claim. (Cl. 116—173)

This invention relates to a flagstaff. Specifically this invention deals with a flagstaff that may be detachably mounted on a vehicle for displaying a small pennant or flag.

In certain businesses, as for example the funeral directing business, it is necessary that vehicles display a pennant when being operated in traffic. Heretofore, flagstaffs have been attached to vehicles by intricate clamping devices or have been loosely disposed in sockets secured on the vehicle. The normal vibrations of the vehicle and the effect of the wind on these flagstaffs cause them to rattle and work loose in their mounting.

According to the features of this invention, a hole is drilled in the hood of the vehicle and a base member having a lower threaded portion and a smooth upper portion with a pin projecting therefrom is clamped therein by means of a nut threaded on the lower base member under the hood. The flagstaff proper has a hollow core arranged to slide over the upper end of the base member and a bayonet slot therein cooperating with the pin on the upper portion of the base member to lock the flagstaff in place. A spring inside the flagstaff is compressed as the flagstaff is slid downwardly over the base member. Thus, the flagstaff is resiliently held in locked position by the bayonet slot, vibrations of the vehicle being automatically absorbed by the spring.

A special feature of this invention is the provision of a spring wire lock or clip which is disposed lengthwise on the outside of the flagstaff and is adapted to secure a pennant in place along its entire length.

Accordingly, it is an object of this invention to provide a flagstaff that is firmly held against vibration and rattling during operation of the vehicle on which it is mounted.

A further object of this invention is to provide a flagstaff which has a simple, effective clamping device for holding a pennant in place against the pull of the wind.

Another object of this invention is to provide means for resiliently mounting a flagstaff on a vehicle.

On the drawings:

Figure 1 is a side elevational view illustrating a pennant secured on a flagstaff which is mounted on a support member in accordance with the teachings of this invention;

Figure 2 is a fragmentary exploded elevational view showing the members of the flagstaff assembly of this invention just prior to being assembled;

Figure 3 is a fragmentary elevational view, partly in section and partly broken away, of the flagstaff assembly of this invention when in assembled condition; and Figure 4 is a fragmentary vertical sectional view taken through the flagstaff.

As shown on the drawings:

The flagstaff assembly of this invention includes an upper flagstaff 10 positioned on a base member 11 which is secured in a supporting piece 12, which may be, for example, the center trim strip at the forward end of the hood of an automobile. A pennant 13, preferably made of cloth, is fastened along one marginal edge thereof to the flagstaff 10.

The base member 11, Figure 2, comprises an upper shank portion 11a and a lower threaded shank portion 11b. A shoulder 11c is formed integrally on the member 11 substantially between the upper and lower portions. A washer 15, which may be loosely disposed on the member 11 or may be integrally formed on the lower portion of a shoulder 11c, is arranged to abut the upper surface of the support member 12, when the base member 11 is fastened thereon, as illustrated in Figure 1. A second washer 16 and a locking nut 17 are disposed on the member 11 below the support member 12. The base member 11 is thus rigidly held on the support member 12 in an upright position.

On the upper shank portion 11a of the base member 11 a pin 19, Figure 3, is secured as by a press fit in a hole 11d. This pin projects outwardly and is arranged to cooperate with a bayonet slot in the flagstaff, to be described in detail hereinafter.

The flagstaff 10 comprises a tubular body member 20 having a sphere 21 disposed on its top portion for ornamentation. A spring clip member 23, preferably made of spring wire, is secured as by welding at its upper end in an indentation 20a of the body member 20. The clip member 23 extends lengthwise along the tubular body member 20 having a central portion 23a pressed closely against the body member 20 and upper and lower end portions 23b and 23c respectively bent away from the body as shown in Figure 3. This construction permits the clip member to exert a resilient pressure against the pennant 13 positioned between the clip and the body member 20.

For the purpose of locking the pennant 13 under the clip 23, the lower end 23d of the clip is extended through a pair of diametrically opposed holes 20b and 20c in the tubular body 20.

A locking nut 25 is disposed on the outer threaded end of the clip 23 for adjusting the pressure exerted thereby by moving the nut against the tubular body member 20.

The tubular body member 20 is resiliently held spaced from the base member 11 by means of a coil spring 28 which is disposed on the inside of the tubular body member 20. As shown in Figures 3 and 4, an upper oversize end portion 28a is forced into the bore of the tube against a shoulder 20d formed therein. The tendency of the end portion to uncoil causes it to be held in the tube thus preventing the spring from falling out of the assembly when the flagstaff is removed from the base member. The spring 28, which is tapered inwardly toward its lower end, is arranged to be contacted by the closed upper end of the base member 11 when the tubular body member 20 is slid thereover, the upper end of the base member 11 being a close fit in the bore of the body member 20.

As best seen in Figure 4, the lower end of the tubular body member 20 is provided with a bayonet slot 30 including a vertical slot 31, a horizontal slot 32, and a downwardly extending recess 33.

The flagstaff 10 is mounted on the base member 11 by sliding the lower end of the tubular body member 20 over the upper end of the base member 11 against the compression of the spring 28. The pin 19 is aligned with the vertical slot 31 as the flagstaff is slid downwardly. When the pin 19 is at the top of the slot 31, the body member 20 is rotated, thus moving the pin 19 horizontally relative to the slot 32. The action of the spring 28 will cause the body member 20 to move upwardly and move the pin 19 into the recess 33. The pin 19 will therefore be held locked in the recess 33 by the resilient action of the spring.

The flagstaff 10 may be quickly and easily removed from the base member 11 by merely pushing the body member 20 downwardly against the action of the spring 28 to remove the pin from the recess 33 and then rotating the body member 20 to cause the pin 19 to be aligned with the vertical slot 31. The flagstaff is then unlocked and may be slid upwardly off the base member 11.

From the foregoing description it is seen that there is provided in this invention a flagstaff that is arranged to be firmly mounted on a vehicle. A spring disposed in the flagstaff automatically absorbs vibrations and shocks and at all times urges the flagstaff into locked position. Spring means is also provided for holding a pennant firmly on the flagstaff.

The flagstaff of the present invention is very simple in construction and may be quickly and easily installed on or removed from a vehicle.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In a pennant carrying flagstaff for detachable securement to a vehicle body, a base member having a smooth cylindrical upper shank portion terminating in a closed upper end and a lower portion for fastening said base member in upright position to the vehicle body, a laterally projecting pin on said shank portion, a tubular staff member having a cylindrical bore in the lower end thereof to receive said shank portion and having a bayonet slot relieved from said bore with a locking recess to receive said pin for locking said staff member and said base member in a detachable assembly, said tubular staff member having an annular shoulder formed at the upper end of said bore, and a tapered coil spring disposed within the bore of said staff member having an oversized upper end turn seated against said shoulder and tending to uncoil to secure said spring frictionally within said bore, said spring having an inwardly tapered lower end for contact with the closed upper end of said shank portion to place said spring in compression between the shank portion of said base member and the shoulder of said staff member when said members are lockingly assembled.

MAURICE W. BURGESS.

REFERENCES CITED

The following references are of record in the file of this patent:

UNITED STATES PATENTS

| Number | Name | Date |
|---|---|---|
| 205,922 | St. John | July 9, 1878 |
| 381,277 | Patton | Apr. 17, 1888 |
| 631,161 | Forehlick et al. | Aug. 14, 1899 |
| 690,837 | Conzett | Jan. 7, 1902 |
| 788,488 | Miller | Apr. 25, 1905 |
| 952,045 | Moore | Mar. 15, 1910 |
| 1,748,625 | Troth | Feb. 25, 1930 |
| 1,755,372 | Smith | Apr. 22, 1930 |
| 2,111,740 | Ruane | Mar. 22, 1938 |
| 2,413,905 | Blackburn | Jan. 7, 1947 |

FOREIGN PATENTS

| Number | Country | Date |
|---|---|---|
| 27,731 | Great Britain | Dec. 2, 1913 |
| 192,787 | Great Britain | Feb. 15, 1923 |